(12) United States Patent
Milleron et al.

(10) Patent No.: US 11,216,494 B2
(45) Date of Patent: Jan. 4, 2022

(54) VIRTUAL ARTIFICIAL INTELLIGENCE BASED CONSULTANT

(71) Applicant: Accenture Global Solutions Limited, Dublin (IE)

(72) Inventors: Jean Milleron, Nanterre (FR); Arnaud Beaufeist, Clichy (FR); Emmanuel Jusserand, Issy (FR); Louis Vatier, Paris (FR)

(73) Assignee: Accenture Global Solutions Limited, Dublin (IE)

( * ) Notice: Subject to any disclaimer, the term of this patent is extended or adjusted under 35 U.S.C. 154(b) by 501 days.

(21) Appl. No.: 16/139,250

(22) Filed: Sep. 24, 2018

(65) Prior Publication Data

US 2019/0095521 A1    Mar. 28, 2019

Related U.S. Application Data

(60) Provisional application No. 62/561,818, filed on Sep. 22, 2017.

(51) Int. Cl.
| | |
|---|---|
| *G06F 16/31* | (2019.01) |
| *G06F 16/951* | (2019.01) |
| *G06F 16/35* | (2019.01) |
| *G06K 9/62* | (2006.01) |
| *G06F 40/289* | (2020.01) |

(52) U.S. Cl.
CPC .......... *G06F 16/313* (2019.01); *G06F 16/35* (2019.01); *G06F 16/951* (2019.01); *G06F 40/289* (2020.01); *G06K 9/6256* (2013.01)

(58) Field of Classification Search
CPC ...... G06F 16/313; G06F 16/35; G06F 16/951; G06F 40/289; G06K 9/6256
See application file for complete search history.

(56) References Cited

U.S. PATENT DOCUMENTS 8,280,877 B2 * 10/2012 Zhang .................. G06F 40/258
707/723
8,676,795 B1 * 3/2014 Durgin ................... G06F 16/34
707/730

(Continued)

OTHER PUBLICATIONS

Australian Office Action in Australian Application No. 2018236707, dated Feb. 21, 2019, 8 pages.

(Continued)

*Primary Examiner* — Richard L Bowen
(74) *Attorney, Agent, or Firm* — Fish & Richardson P.C.

(57) ABSTRACT

Methods, systems, and apparatus, including computer programs encoded on a computer storage medium, for providing a virtual consultant. The methods, systems, and apparatus include actions of obtaining a set of training data that indicates raw topics that are indicative of the set of topics, training a model to identify raw topics relevant to a set of topics, the set of topics associated with one or more digital documents, identifying, within at least one of the digital documents and with the model, raw topics that correspond to the set of topics, determining, for each identified raw topic, a frequency that the raw topic appears in the digital document, determining, for each of the identified raw topics, a topic that corresponds to the raw topic, determining, for each of the topics of the set of topics, a topic score, and providing an indication of the topic scores for the digital document.

15 Claims, 3 Drawing Sheets

(56) References Cited

U.S. PATENT DOCUMENTS

| | | | | |
|---|---|---|---|---|
| 8,996,350 | B1* | 3/2015 | Dub | G06F 16/353 |
| | | | | 704/1 |
| 9,047,283 | B1* | 6/2015 | Zhang | G06F 40/205 |
| 9,679,018 | B1 | 6/2017 | Yuksel et al. | |
| 9,720,914 | B2* | 8/2017 | Agrawal | G06F 16/94 |
| 2004/0225667 | A1* | 11/2004 | Hu | G06F 16/345 |
| 2009/0327264 | A1 | 12/2009 | Yu et al. | |
| 2010/0306248 | A1* | 12/2010 | Bao | G06F 16/93 |
| | | | | 707/769 |
| 2010/0332520 | A1* | 12/2010 | Lu | G06Q 50/18 |
| | | | | 707/769 |
| 2011/0252045 | A1* | 10/2011 | Garg | G06F 16/951 |
| | | | | 707/750 |
| 2013/0138577 | A1 | 5/2013 | Sisk | |
| 2015/0066953 | A1 | 3/2015 | Krusell et al. | |
| 2016/0147891 | A1* | 5/2016 | Chhichhia | G06F 16/986 |
| | | | | 707/734 |

OTHER PUBLICATIONS

Xiang et al., "A supervised approach to predict company acquisitions with factual and topic features using profiles and new articles on techcrunch," Proceedings of the Sixth International Conference on Weblogs and Social Media, Dublin, Ireland, and Spain, Jun. 4-7, 2012, 5 pages.

AU Office Action in Australian Application No. 2018236707, dated Jan. 15, 2020, 8 pages.

Biei et al., "Hierarchical Topic Models and the Nested Chinese Restaurant Process", Advances in Neural Information Processing Systems 16: Proceedings of the 2003 Conference, 8 pages.

Blei et al.,"Latent Dirichlet Allocation", Journal of Machine Learning Research,2003, 3 (4-5): pp. 993-1022.

Yao et al., "Efficient methods for topic model inference on streaming document collections", 15th ACM SIGKDD international conference on Knowledge discovery and data mining, 2009, 9 pages.

IN Office Action in Indian Appln. No. 201814035848, dated Dec. 22, 2020, 7 pages.

* cited by examiner

VIRTUAL ARTIFICIAL INTELLIGENCE BASED CONSULTANT

CROSS-REFERENCE TO RELATED APPLICATION

This application claims the benefit of U.S. Provisional Application No. 62/561,818, filed Sep. 22, 2017 and titled "VIRTUAL ARTIFICIAL INTELLIGENCE BASED CONSULTANT," which is incorporated by reference in its entirety.

TECHNICAL FIELD

This disclosure generally relates to artificial intelligence.

BACKGROUND

Search engines may crawl webpages to index the webpages. The search engines may then provide search results that link to the webpages in response to search queries that include search terms that are relevant to the content in the webpages. The search results may then be analyzed to make determinations.

SUMMARY

In general, an aspect of the subject matter described in this specification may involve a process for providing a virtual content generator that adaptively generates content based on query content and syntax. In some implementations, the virtual content generate may operate as a virtual consultant. A virtual consultant may use artificial intelligence to provide strategic information to users. In some cases, the virtual consultant may adaptively provide strategic information by identifying and providing documents that are relevant to a topic. For example, a user may specify a particular topic of interest and, in response, the virtual consultant may automatically crawl news sources, use artificial intelligence to determine topics for these news articles, and then notify a user of news articles that are relevant to the particular topic of interest.

Additionally or alternatively, the virtual consultant may indicate a likelihood of success of an entity, e.g., a company, based on topics determined for documents regarding the entity. For example, the virtual consultant may determine topics in annual reports of the entity (e.g., financial information), transcripts of an earnings call of the entity, or other documents regarding the entity to determine topics relevant to the entity and then a likelihood of success for the entity based on the topics. Additionally or alternatively, the virtual consultant may identify entities that may be relevant to a need. For example, from the topics determined for documents regarding an entity, the virtual consultant may then determine whether the entity is relevant to a need. The topics determined for documents by the virtual consultant using artificial intelligence may be used by the virtual consultant for other purposes as well. For example, determining trends in industries, identifying people that may be relevant to an entity, etc.

One innovative aspect of the subject matter described in this specification is embodied in a method that includes the actions of obtaining a set of training data that indicates raw topics that are indicative of the set of topics, training, with the set of training data, a model to identify raw topics relevant to a set of topics, the set of topics associated with one or more digital documents, identifying, within at least one of the digital documents and with the model, raw topics that correspond to the set of topics, determining, for each identified raw topic, a frequency that the raw topic appears in the digital document, determining, for each of the identified raw topics, a topic that corresponds to the raw topic, the topic selected from the set of topics, determining, for each of the topics of the set of topics, a topic score, the topic score reflecting a relevance of the digital document to the topic, and the topic score based on the frequency of the raw topics that correspond to the topic, and providing an indication of the topic scores for the digital document.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. For instance, in some aspects identifying, within a document and with the model, raw topics that correspond to a set of topics includes providing text of the document as input into the model and receiving indications of an appearance of phrases that correspond to the raw topics from the model. In certain aspects, determining, for each of the raw topics that are identified, a frequency that the raw topic appears in the document includes determining, for each of the phrases from which the raw topic was identified, a raw topic score and a proportion of the document that the phrase makes up and determining the frequency that the raw topics appears in the document based on the raw topic scores of the phrases from which the raw topic was identified and the proportions of the document that each of the phrases from which the raw topic was identified makes up.

In some implementations, determining the frequency that the raw topics appears in the document based on the raw topic scores of the phrases from which the raw topic was identified and the proportions of the document that each of the phrases from which the raw topic was identified makes up includes for each of the phrases from which the raw topic is identified, counting a number of words in the phrase, dividing the number of words in the phrase by the number of words in the document as a proportion for the phrase, and multiplying the proportion for the phrase by a raw topic score of the phrase as a weighted raw topic score for the phrase, and summing the weighted raw topic score for all the phrases from which the raw topic is identified as the frequency that the raw topic appears in the document.

In certain aspects, determining, for each of the raw topics that are identified, a topic of the set of topics that corresponds to the raw topic includes obtaining a pre-defined map that identifies pairs of raw topics and topics and determine, for each raw topic, the topic identified by the pre-defined map as a pair to the raw topic. In some aspects, determining, for each of the topics of the set of topic, a topic score includes for each of the topics of the set of topic scores, summing frequencies of the raw topics that correspond to the topic. In some implementations, the document is about an entity and the actions include determining a success score for the entity based on the topic scores for the document and determining whether to provide an indication of the entity based on the success score for the entity.

In some aspects, determining a success score for the entity includes obtaining a second set of topic scores for a second document about the entity, determining aggregate topic scores from the topic scores for the document and the second set of topic scores for the second document and determining the success score based on the aggregate topic scores.

Details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
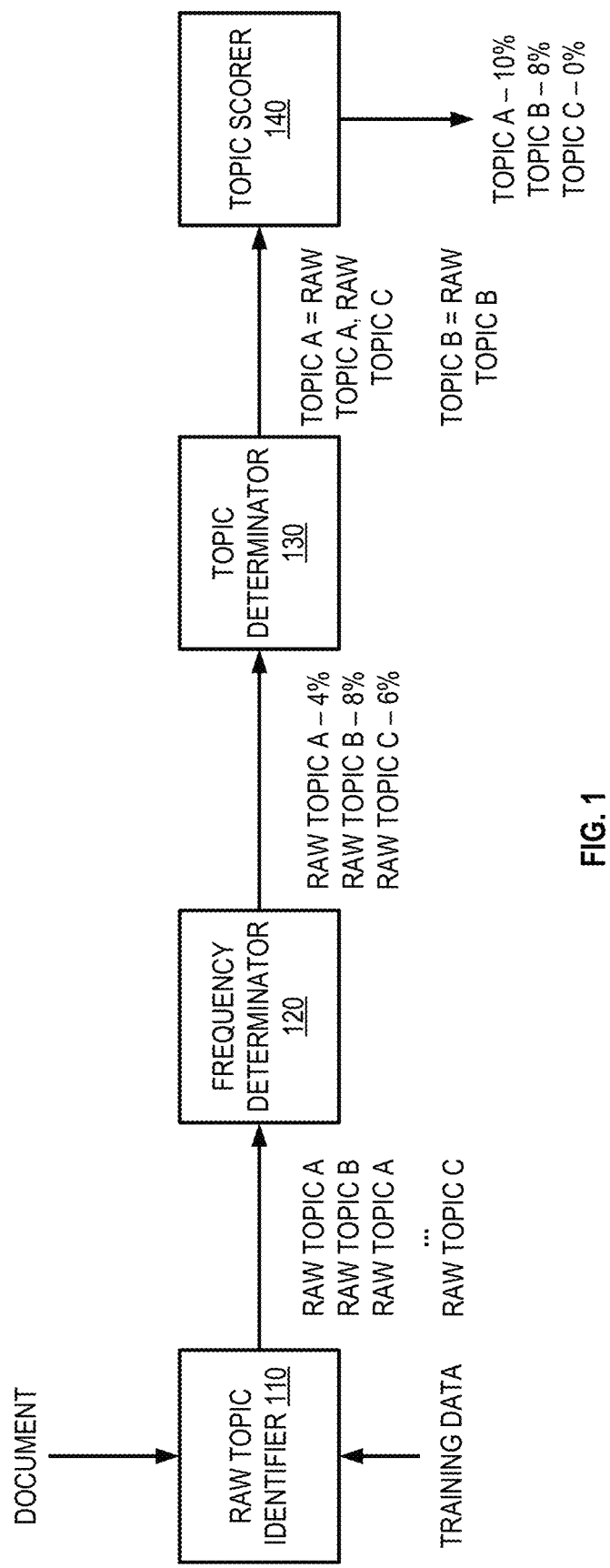
FIG. 1 illustrates an example block diagram of a system for providing a virtual consultant.

A virtual consultant may use artificial intelligence to learn to provide strategy information to users. The virtual consultant may be an end-to-end solution for delivering strategy work using a virtual, machine-based solution to deliver strategy work too complex for human consultants to reliably and/or efficiently perform. The virtual consultant may use artificial intelligence (AI), natural language processing (NLP), chatbots, machine learning, cognitive computing and other advanced techniques to perform complex tasks associated with delivering end to end (E2E) consulting services.

The virtual consultant may include, among other things, an enriched chatbot, autonomous machine-driven crawling logic to obtain information, industry benchmarking logic, interview queries and response logic, automatic classification logic, detailed business outcome generating logic, concept clustering logic, profit and loss (P&L) and assumption data analytics engine, and security logic. The virtual consultant may deliver consulting results faster, more consistently, more efficiently, and/or more accurately than can currently be done using conventional techniques, e.g., human consultants. In addition, the virtual consultant may lower the cost of delivering consulting services and further lower the cost to clients for a given consulting project.

In some implementations, an administrator may initialize a virtual consultant for use by a client. A client may refer to a person, an organization, or some other type of entity. The administrator may provide a client name, specify an industry, specify competition, specify profit and loss structure and figures, and/or specify client contact details.

The virtual consultant may crawl digital information from public online sources and internal sources using the crawling logic. This digital information may be in the form of documents, which may be news articles, financial reports, call transcripts, etc. The digital information may additionally be in the form of structured data such as tables and columns. The virtual consultant may qualify each crawled document using artificial intelligence to log topics, e.g., business and technology attributes, regarding the document, and the virtual consultant may store the documents with topics into a document bank. The topics may be one or more of industry type, technology type, business impact type, function type, digital levers, etc. Digital levers may include, but are not limited to, one or more of enhanced new customer rate, enhanced churn rate, digital enrollment percentage, paperless billing percentage, electronic payment participation percentage, digital communication percentage, and full interactive voice response call resolution.

The client may receive an invitation to use the virtual consultant after initialization by the administrator. For example, the client may receive an email inviting the client to click on a link. After clicking on the link, the client may be connected with the virtual consultant and may start a discussion using, for example, NLP. During the discussion, the virtual consultant may review the information that has been specified by the administrator during the initialization and qualify expected outcomes. The virtual consultant may then select relevant documents from the document bank using a weighted expectation matrix and an artificial intelligence document selection routine. The artificial intelligence document selection routine may be based on a cosine distance enriched with collaborative filtering based on interest of similar clients. The virtual consultant may select documents based on selecting previously performed documents in the document bank that match an industry and expected outcomes from the client, e.g., business impacts, functions, etc., and impact on profit and loss.

The administrator may receive the document selections, determine which selections to use enrich the artificial intelligence document selection routine, and use those determined selections to train the artificial intelligence document selection routine. The client may then browse the selected documents and indicate which documents are relevant and which are not relevant. The artificial intelligence document selection routine may further be trained based on the selections from the client.

The virtual consultant may then review the documents selected by the client and group them into clusters that address sets of digital levers. For example, the clusters may be mapped to the profit and loss elements that were earlier specified by the administrator and the client. The virtual consultant may provide impacts on the profit and loss structure through the digital levers to the client and the client may modify the profit and loss inputs to adjust results from a digital transformation scope. The virtual consultant may then compute final impacts from the adjustments and prepare a final result which is then presented to the client. The final result may include a scope for a digital transformation, impacts on profit and loss, and digital levers that are impacted.

FIG. 1 illustrates an example block diagram of a system 100 for providing a virtual consultant. The system 100 includes a raw topic identifier 110 that identifies raw topics within a document, a frequency determinator 120 that determines raw topic scores for the document, a topic determinator 130 that maps the raw topics to a set of topics, and a topic scorer 140 that scores the relevance of the document to the topics of the set of topics.

The raw topic identifier 110 may receive a document and identify raw topics, in the document, that are indicative of a set of topics. For example, the raw topic identifier 110 may obtain a document and identify raw topics from various phrases in the document. A raw topic may be a classification that can be mapped to a topic from the set of topics. A phrase may be a sequence of one or more words.

The raw topic identifier 110 may be trained to identify the raw topics using a set of training data. For example, the raw topic identifier 110 may be trained using a set of training data that includes phrases that are each labeled as either indicative of a raw topic or not indicative of a raw topic. Where the phrase is labeled as indicative of a raw topic, the phrase may be labelled with the raw topic to which it is indicative. In some implementations, the set of training data may include structured data that classifies phrases as corresponding to particular categories, e.g., DBPedia datasets that classify information into Wikipedia Categories.

The raw topic identifier 110 may be a model that is a neural network that uses deep learning. For example, the raw topic identifier 110 may be a neural network that is trained on the dataset using deep learning. For each identification of a raw topic, the raw topic identifier 110 may indicate a raw topic score that indicates a confidence of the raw topic identifier 110 that the phrase from which the raw topic is identified is relevant to the raw topic indicated. For example, a raw topic score of 80% for an appearance of Phrase A in a document from which raw topic A is identified may indicate an 80% confidence that Phrase A is relevant to raw topic A.

The raw topic identifier 110 may provide the identification of raw topics to the frequency determinator 120. For example, the raw topic identifier 110 may indicate to the frequency determinator 120, for each identified raw topic, the raw topic and the raw topic score and location for each phrase from which the raw topic is identified. The location may include a beginning and ending location in the document so that the number of words in the phrase may be counted.

The frequency determinator 120 may receive the identification of the raw topics from the frequency determinator 120 and determine a frequency that the raw topics appear in the document. For each raw topic, the frequency determinator 120 may determine the frequency based on the raw topic score and location for each phrase from which the raw topic was identified.

For example, the frequency determinator 120 may receive an indication of "Raw Topic A," a raw topic score of "80%," and a location of Phrase A and an indication of "Raw Topic A," a raw topic score of "40%," and a location of Phrase B. The frequency determinator 120 may then count the number of words in the document and determine there are one hundred words in the document, count the number of words in Phrase A from the location and determine there are three words in Phrase A, divide three representing the number of words in Phrase A by one hundred representing the number of words in the document to arrive at 3%, weight 3% by the raw topic score for 80% by multiplying to arrive at 2.4%, count the number of words in Phrase B from the location and determine there are four words in Phrase A, divide four representing the number of words in Phrase B by one hundred representing the number of words in the document to arrive at 4%, weight 4% by the raw topic score for 40% by multiplying to arrive at 1.6%, and then sum 2.4% from Phrase A and 1.6% from Phrase B to arrive at 4% for the document for Raw Topic A.

In another example, the frequency determinator 120 may receive an indication of "Raw Topic B," a raw topic score of 100%, and a location of Phrase C where there is no other phrase from which Raw Topic B is identified. The frequency determinator 120 may then count the number of words in the document and determine there are one hundred words in the document, count the number of words in Phrase C from the location and determine there are eight words in Phrase C, divide eight representing the number of words in Phrase C by one hundred representing the number of words in the document to arrive at 8%, weight 8% by the raw topic score of 100% for Phrase C by multiplying to arrive at 8% for Raw Topic B.

The frequency determinator 120 may provide an indication of the frequencies determined for the raw topics to the topic determinator 130. For example, the frequency determinator 120 may provide an indication of 4% for raw topic A, an indication of 8% for raw topic B, and an indication of 6% for raw topic C to the topic determinator 130.

The topic determinator 130 may determine topics that correspond to the identified phrases. For example, the topic determinator 130 may determine raw topic A corresponds to Topic A and that raw topic B corresponds to Topic B. The topic determinator 130 may determine the topics that correspond to the identified raw topics based on a pre-defined map that identifies pairs of raw topics and topics. For example, the topic determinator 130 may obtain a table that lists raw topics in a left hand column and topics in a right hand column and, for each identified raw topic, identify the corresponding row in the table with a left hand column value that matches and determine the corresponding topic as the right hand column value for the row. The pre-defined map may be manually generated by a person or automatically generated. For example, the pre-defined map may be generated with machine learning.

The topic determinator 130 may provide the topics determined for the phrases to the topic scorer 140. For example, the topic determinator 130 may provide the topic scorer 140 an indication that raw topic A has a frequency of 4% and corresponds to Topic A, raw topic B has a frequency of 8% and corresponds to Topic B, and raw topic C has a frequency of 6% and corresponds to Topic A.

The topic scorer 140 may score the relevance of the document to the documents based on the topics determined by the topic determinator 130 and the frequencies determined by the frequency determinator 120. For example, the topic scorer 140 may determine a topic score of 10% for Topic A, a topic score of 8% for Topic B, and topic score of 0% for Topic C. The topic score of a document may be a score that is indicative of a likely relevance of the topic to the document. For example, the topic score may be a value ranging from 0-100% where 0% indicates a 0% likelihood of relevance and 100% indicates a 100% likelihood of relevance.

As described above, the topic scores for the document may then be used to make various other determinations and indications. For example, the topic scores may be used to identify whether the document is relevant to a request from a user to view documents about a particular topic.

In some implementations, the system 100 may determine topic scores for entities based on documents regarding the entities. For example, the system 100 may obtain an earning calls transcript for the entity and an annual report for the entity, and then determine topics for the entity based on the two documents. In a particular example, for determining a topic of an entity based on two documents regarding the entity, the frequency determinator 120 may determine a frequency for each raw topic within each document separately, and then, for each raw topic, average the frequency for the raw topic between the two documents to arrive at a frequency for the entity. Use of the frequency determinator 120 may remove length bias when looking across multiple documents. For example, longer documents may be biased towards having more occurrences of raw topics than shorter documents.

In some implementations, the system 100 may determine topics of interest for an industry. For example, the system 100 may use the topics determined for entities within a particular industry to then determine topics of interest for the industry. The system 100 may determine entities that are within a particular industry based on a classification of the entity to an industry, e.g., referencing a manual classification of entities to industries, obtain the topic scores for each of the entities in the industry, and then average the topic scores for the entities to arrive at aggregated topic scores for the industry. In some implementations, the system 100 may indicate an evolution of interest within the industry. For example, the system 100 may indicate a percentage change, for each topic, in an aggregated topic score for an industry determined from documents published in a prior year for multiple entities within the industry to an aggregated topic score determined from documents published in a current year for the multiple entities.

In some implementations, the system 100 may normalize topic scores or raw topic scores for documents. For example, the system 100 could determine the highest score for Topic A from among all the documents analyzed by the system 100, and then scale the scores for Topic A for all the documents so that the highest score for Topic A is 100%. The scaling may be a smoothing function and not necessarily linear.

In some implementations, the system 100 may detect raw topics that are not mapped to topics to determine emerging topics. For example, the system 100 may determine that a raw topic "Teleportation" is appearing more and more often in documents and, in response, provide a notification.

Figure 2:
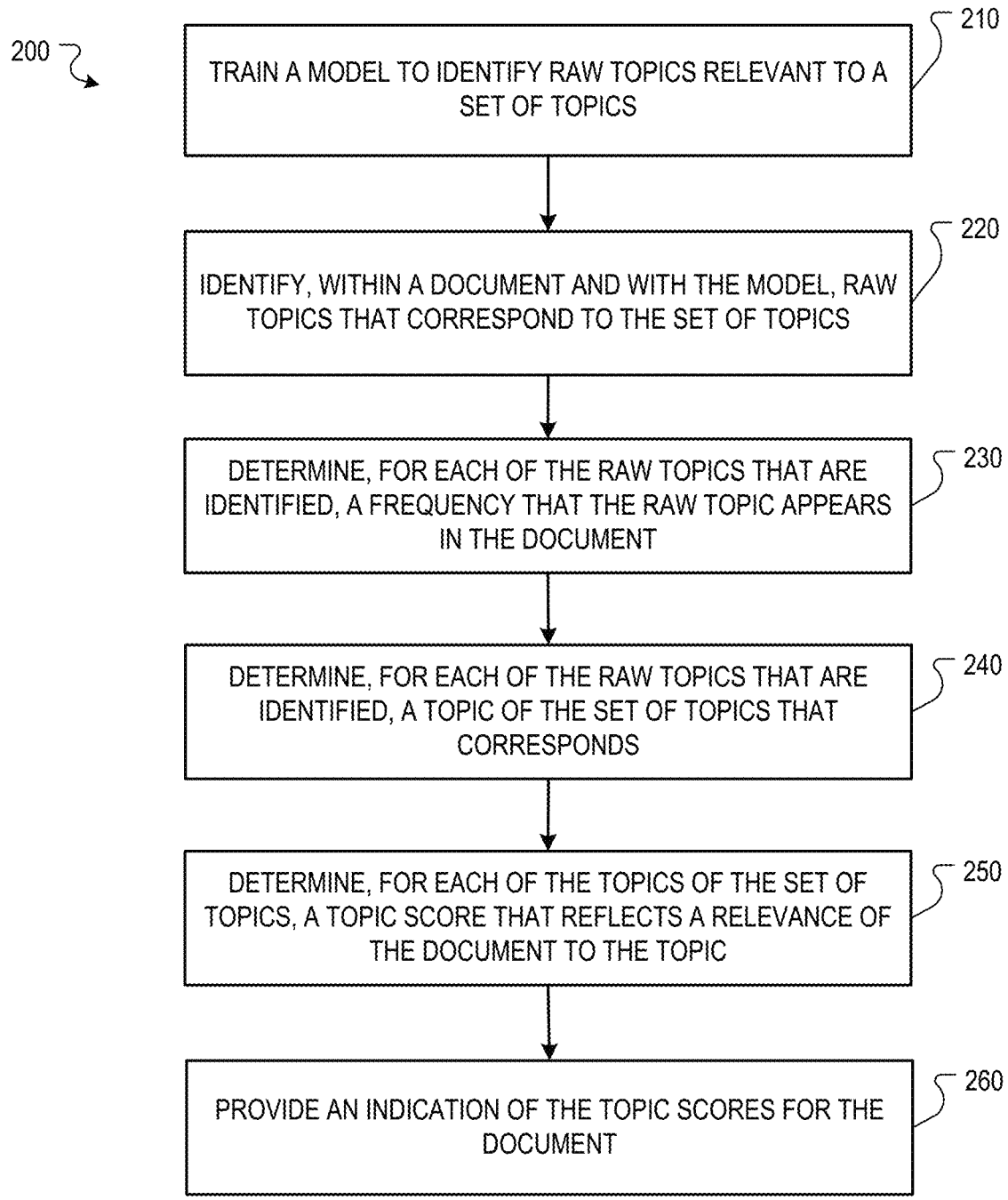
FIG. 2 illustrates a flow diagram that illustrates an example process for providing a virtual consultant.

FIG. 2 illustrates a flow diagram that illustrates an example process 200 for providing a virtual consultant. The operations of the process 200 may be performed by system 100 or other systems. Briefly, and described in more detail below, the process 200 includes training a model to identify raw topics relevant to a set of topics (210), identifying, within a document and with the model, raw topics that correspond to the set of topics (220), determining, for each of the raw topics that are identified, a frequency that the raw topic appears in the document (230), determining, for each of the raw topics that are identified, a topic of the set of topics that corresponds to the phrase (240), determining, for each of the topics of the set of topics, a topic score that reflects a relevance of the document to the topic based on the frequency of the raw topics that correspond to the topic (250), and providing an indication of the topic scores for the document (260).

The process 200 includes training a model to identify raw topics relevant to a set of topics (210). For example, the raw topic identifier 110 may be trained to identify "artificial intelligence," "machine learning," and "productivity" as raw topics relevant to the set of topics. In some implementations, training a model to identify raw topics relevant to a set of topics includes obtaining a set of training data that indicates raw topics that are as indicative of the set of topics and training a neural network to identify raw topics relevant to a set of topics. For example, the system 100 may obtain a set of training data, train a neural network with the set of training data, and then use the trained neural network as the raw topic identifier 110.

The process 200 includes identifying, within a document and with the model, raw topics that correspond to the set of topics (220). For example, the raw topic identifier 110 may identify each occurrence of the raw topics "artificial intelligence," "machine learning," and "productivity" within the document. In some implementations, identifying, within a document and with the model, raw topics that correspond to a set of topics includes providing text of the document as input into the model and receiving indications of an appearance of phrases that correspond to the raw topics from the model. For example, the text of the document may be provided as input into the raw topic identifier 110 and the raw topic identifier 110 may then output indications whether portions of the text are phrases that corresponds to the raw topics.

The process 200 includes determining, for each of the raw topics that are identified, a frequency that the raw topic appears in the document (230). For example, the frequency determinator 120 may determine that the raw topic "artificial intelligence" occurs at a 4% frequency, the raw topic "machine learning" occurs at an 8% frequency, and the raw topic "productivity" occurs at a 6% frequency. In some implementations, determining, for each of the raw topics that are identified, a frequency that the raw topic appears in the document includes determining, for each of the phrases from which the raw topic was identified, a raw topic score and a proportion of the document that the phrase makes up and determining the frequency that the raw topics appears in the document based on the raw topic scores of the phrases from which the raw topic was identified and the proportions of the document that each of the phrases from which the raw topic was identified makes up.

For example, the frequency determinator 120 may receive an indication of "Raw Topic A," a raw topic score of "80%," and a location of Phrase A and an indication of "Raw Topic A," a raw topic score of "40%," and a location of Phrase B. The frequency determinator 120 may then count the number of words in the document and determine there are one hundred words in the document, count the number of words in Phrase A from the location and determine there are three words in Phrase A, divide three representing the number of words in Phrase A by one hundred representing the number of words in the document to arrive at 3%, weight 3% by the raw topic score for 80% by multiplying to arrive at 2.4%, count the number of words in Phrase B from the location and determine there are four words in Phrase A, divide four representing the number of words in Phrase B by one hundred representing the number of words in the document to arrive at 4%, weight 4% by the raw topic score for 40% by multiplying to arrive at 1.6%, and then sum 2.4% from Phrase A and 1.6% from Phrase B to arrive at 4% for the document for Raw Topic A.

The process 200 includes determining, for each of the raw topics that are identified, a topic of the set of topics that corresponds to the phrase (240). For example, the topic determinator 130 may determine that the raw topic "artificial intelligence" and "machine learning" correspond to the topic "AI" and the raw topic "productivity" corresponds to the topic "productivity." In some implementations, determining, for each of the raw topics that are identified, a topic of the set of topics that corresponds to the raw topic includes obtaining a pre-defined map that identifies pairs of raw topics and topics and determining, for each raw topic, the topic identified by the pre-defined map as a pair to the raw topic. For example, the topic determinator 130 may obtain a pre-defined map in the form of a table that lists a first row with the raw topic "artificial intelligence" on the left and "AI" on the right and a second row with the raw topic "machine learning" on the left and "AI" on the right, and then determines that both the raw topic "artificial intelligence" and "machine learning" correspond to the topic "AI" based on identifying the corresponding rows in the table.

The process 200 includes determining, for each of the topics of the set of topics, a topic score that reflects a relevance of the document to the topic based on the frequency of the raw topics that correspond to the topic (250). For example, the topic scorer 140 may determine a topic score of 10% for the topic "AI," a topic score of 8% for the topic "productivity," and a topic score of 0% for the topic "blockchain." In some implementations, determining, for each of the topics of the set of topic, a topic score that reflects a relevance of the document to the topic based on the frequency of the raw topics that correspond to the topic includes summing frequencies of the raw topics that correspond to the topic. For example, the topic scorer 140 may sum the frequency of 4% for the raw topic "artificial intelligence" and 6% for the raw topic "machine learning" that both correspond to the topic "AI" to arrive at a topic score of 10%.

The process 200 includes providing an indication of the topic scores for the document (260). For example, the topic scorer 140 may provide the topic scores for display to the user with an indication that the topic scores are for the document. In some implementations, the process 200 includes, e.g., where the document is about an entity, determining a success score for the entity based on the topic scores for the document and determining whether to provide an indication of the entity based on the success score for the entity. For example, the system 100 may include a request to view entities that are likely to be acquired within a year and, in response, determine a success score for a particular entity based on the topic scores for documents about the particular entity, determine that the success score for the particular entity satisfies a success criteria, and, in response, display the name of the particular entity as an entity likely to be acquired within a year.

In some implementations, determining a success score for the entity includes obtaining a second set of topic scores for a second document about the entity, determining aggregate topic scores from the topic scores for the document and the second set of topic scores for the second document, and determining the success score based on the aggregate topic scores. For example, the system 100 may obtain a topic score of 10% for AI in an annual report published by the entity, obtain a second topic score of 8% for AI in a transcript of an annual earnings call of the entity, determine an aggregate score of 9% for AI for the entity based on the two documents, and then determine the success score based on the aggregate score of 9%.

Figure 3:
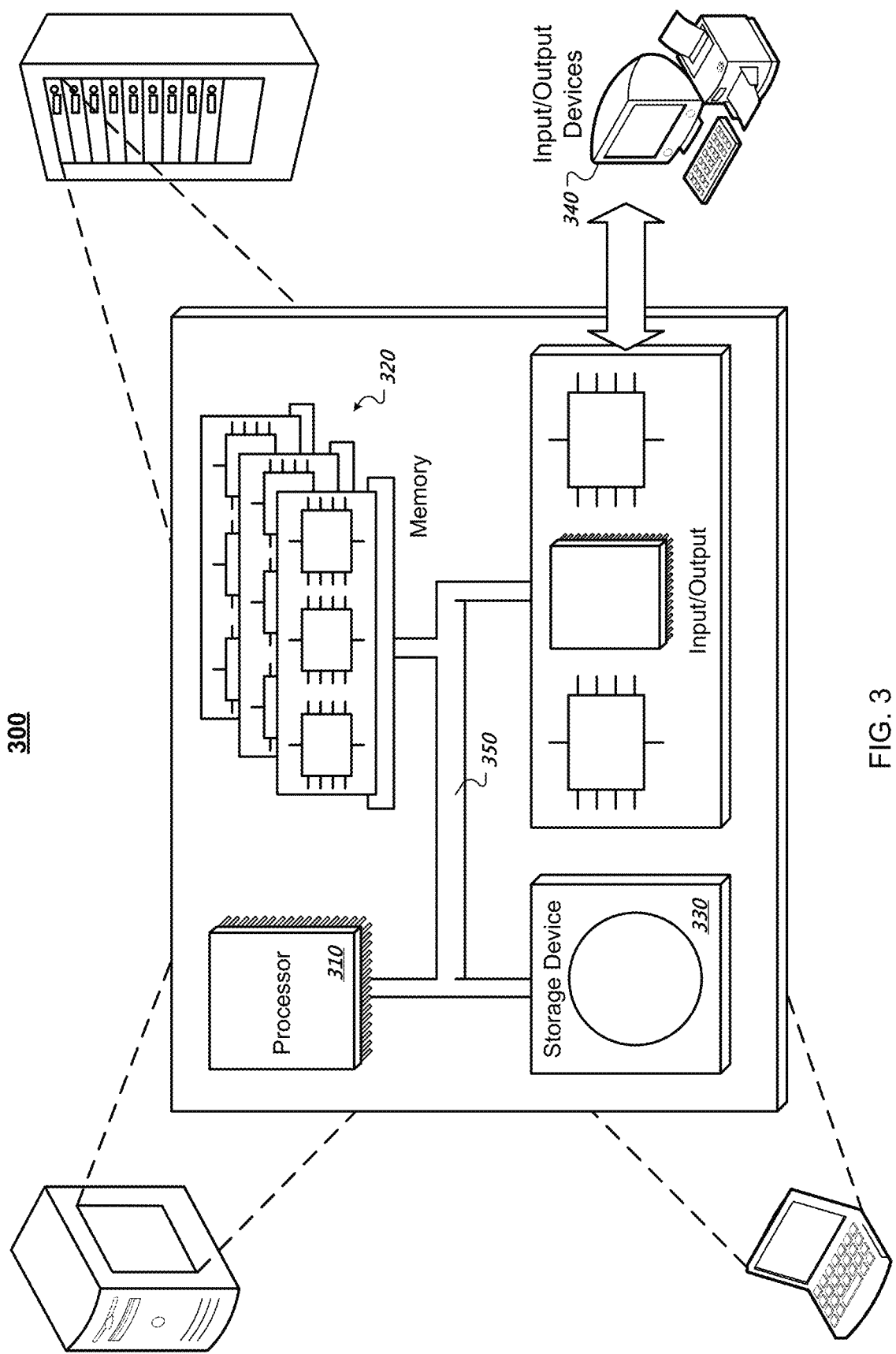
FIG. 3 illustrates a schematic diagram of an exemplary generic computer system.

FIG. 3 illustrates a schematic diagram of an exemplary generic computer 300 system. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, a solid-state drive, an optical disk device, a tape device, universal serial bus stick, or some other storage device.

The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A computer-implemented method, comprising:
    obtaining a set of training data that indicates, for one or more digital documents, raw topics that are indicative of a set of topics associated with the one or more digital documents;
    training, with the set of training data, a deep learning based neural network model to determine relevancy of phrases to the raw topics;
    identifying, by the deep learning based neural network model and within a particular digital document, phrases that correspond to the raw topics;
    determining, for each of the phrases that were identified, (i) a raw topic score that reflects a confidence that the phrase is relevant to the corresponding raw topic and (ii) a proportion of the particular digital document that is formed from the phrase;
    determining, for each of the raw topics that correspond to the phrases that were identified, a topic that corresponds to the raw topic,
        the topic selected from the set of topics;
    determining, for each of the topics that were determined to correspond to the raw topics that correspond to the phrases that were identified, a topic score,
        the topic score reflecting a relevance of the particular digital document to the topic, and
        the topic score based on a sum of the raw topic scores, of the phrases that were identified as corresponding to the raw topics that correspond to the topic, weighted by the proportions of the digital document that are formed from the phrases that were identified as corresponding to the raw topics that correspond to the topic;
    providing an indication of the topic scores for the digital document;
    receiving a request from a user for documents about a particular topic; and
    identifying, based on the indication of the topic scores for the digital document, the digital document to the user in response to the request.

2. The method of claim 1, wherein identifying, within a particular digital document and with the model, phrases that correspond to the raw topics; comprises:
    providing text of the document as input into the model; and
    receiving indications of appearances of the phrases that correspond to the raw topics from the model.

3. The method of claim 1, wherein determining, for each of the topics that were determined to correspond to the raw topics that correspond to the phrases that were identified, a topic score comprises:
    for each of the phrases from which the raw topic is identified:
        counting a number of words in the phrase;
        dividing the number of words in the phrase by the number of words in the particular digital document as a proportion for the phrase; and
        multiplying the proportion for the phrase by a raw topic score of the phrase as a weighted raw topic score for the phrase; and
    summing the weighted raw topic score for all the phrases from which the raw topic is identified for all the raw topics that correspond to the topic.

4. The method of claim 1, wherein determining, for each of the raw topics that were determined to correspond to the raw topics that correspond to the phrases that were identified, a topic that corresponds to the raw topic comprises:
    obtaining a pre-defined map that identifies pairs of raw topics and topics; and
    determine, for each raw topic, the topic identified by the pre-defined map as a pair to the raw topic.

5. The method of claim 1, wherein the document is about an entity and comprising:
    determining a success score for the entity based on the topic scores for the document; and
    determining whether to provide an indication of the entity based on the success score for the entity.

6. The method of claim 5, wherein determining a success score for the entity comprises:
    obtaining a second set of topic scores for a second document about the entity, determining aggregate topic scores from the topic scores for the document and the second set of topic scores for the second document; and
    determining the success score based on the aggregate topic scores.

7. A system comprising:
    one or more computers and one or more storage devices storing instructions that are operable, when executed by the one or more computers, to cause the one or more computers to perform operations comprising:
        obtaining a set of training data that indicates, for one or more digital documents, raw topics that are indicative of a set of topics associated with the one or more digital documents;
        training, with the set of training data, a deep learning based neural network model to determine relevancy of phrases to the raw topics;
        identifying, by the deep learning based neural network model and within a particular digital document, phrases that correspond to the raw topics;
        determining, for each of the phrases that were identified, (i) a raw topic score that reflects a confidence that the phrase is relevant to the corresponding raw topic and (ii) a proportion of the particular digital document that is formed from the phrase;
        determining, for each of the raw topics that correspond to the phrases that were identified, a topic that corresponds to the raw topic,
            the topic selected from the set of topics;
        determining, for each of the topics that were determined to correspond to the raw topics that correspond to the phrases that were identified, a topic score,
            the topic score reflecting a relevance of the particular digital document to the topic, and
            the topic score based on a sum of the raw topic scores, of the phrases that were identified as corresponding to the raw topics that correspond to the topic, weighted by the proportions of the digital document that are formed from the phrases that were identified as corresponding to the raw topics that correspond to the topic;
providing an indication of the topic scores for the digital document;
receiving a request from a user for documents about a particular topic; and
identifying, based on the indication of the topic scores for the digital document, the digital document to the user in response to the request.

8. The system of claim 7, wherein identifying, within a particular digital document and with the model, phrases that correspond to the raw topics; comprises:
providing text of the document as input into the model; and
receiving indications of appearances of the phrases that correspond to the raw topics from the model.

9. The system of claim 7, wherein determining, for each of the topics that were determined to correspond to the raw topics that correspond to the phrases that were identified, a topic score comprises:
for each of the phrases from which the raw topic is identified:
counting a number of words in the phrase;
dividing the number of words in the phrase by the number of words in the particular digital document as a proportion for the phrase; and
multiplying the proportion for the phrase by a raw topic score of the phrase as a weighted raw topic score for the phrase; and
summing the weighted raw topic score for all the phrases from which the raw topic is identified for all the raw topics that correspond to the topic.

10. The system of claim 7, wherein determining, for each of the raw topics that were determined to correspond to the raw topics that correspond to the phrases that were identified, a topic that corresponds to the raw topic comprises:
obtaining a pre-defined map that identifies pairs of raw topics and topics; and
determine, for each raw topic, the topic identified by the pre-defined map as a pair to the raw topic.

11. The system of claim 7, wherein the document is about an entity and comprising:
determining a success score for the entity based on the topic scores for the document; and
determining whether to provide an indication of the entity based on the success score for the entity.

12. The system of claim 11, wherein determining a success score for the entity comprises:
obtaining a second set of topic scores for a second document about the entity, determining aggregate topic scores from the topic scores for the document and the second set of topic scores for the second document; and
determining the success score based on the aggregate topic scores.

13. A non-transitory computer-readable medium storing instructions executable by one or more computers which, upon such execution, cause the one or more computers to perform operations comprising:

obtaining a set of training data that indicates, for one or more digital documents, raw topics that are indicative of a set of topics associated with the one or more digital documents;
training, with the set of training data, a deep learning based neural network model to determine relevancy of phrases to the raw topics;
identifying, by the deep learning based neural network model and within a particular digital document, phrases that correspond to the raw topics;
determining, for each of the phrases that were identified, (i) a raw topic score that reflects a confidence that the phrase is relevant to the corresponding raw topic and (ii) a proportion of the particular digital document that is formed from the phrase;
determining, for each of the raw topics that correspond to the phrases that were identified, a topic that corresponds to the raw topic,
the topic selected from the set of topics;
determining, for each of the topics that were determined to correspond to the raw topics that correspond to the phrases that were identified, a topic score,
the topic score reflecting a relevance of the particular digital document to the topic, and
the topic score based on a sum of the raw topic scores, of the phrases that were identified as corresponding to the raw topics that correspond to the topic, weighted by the proportions of the digital document that are formed from the phrases that were identified as corresponding to the raw topics that correspond to the topic;
providing an indication of the topic scores for the digital document;
receiving a request from a user for documents about a particular topic; and
identifying, based on the indication of the topic scores for the digital document, the digital document to the user in response to the request.

14. The medium of claim 13, wherein identifying, within a particular digital document and with the model, phrases that correspond to the raw topics; comprises:
providing text of the document as input into the model; and
receiving indications of appearances of the phrases that correspond to the raw topics from the model.

15. The medium of claim 13, wherein determining, for each of the topics that were determined to correspond to the raw topics that correspond to the phrases that were identified, a topic score comprises:
for each of the phrases from which the raw topic is identified:
counting a number of words in the phrase;
dividing the number of words in the phrase by the number of words in the particular digital document as a proportion for the phrase; and
multiplying the proportion for the phrase by a raw topic score of the phrase as a weighted raw topic score for the phrase; and
summing the weighted raw topic score for all the phrases from which the raw topic is identified for all the raw topics that correspond to the topic.

* * * * *